US008250232B2

(12) United States Patent  (10) Patent No.: US 8,250,232 B2
Gordon  (45) Date of Patent: Aug. 21, 2012

(54) INTELLIGENT CONTENT STREAM BANDWIDTH DETERMINATION

(75) Inventor: Michael M. Gordon, Paradise Valley, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 12/563,660

(22) Filed: Sep. 21, 2009

(65) Prior Publication Data

US 2010/0077099 A1  Mar. 25, 2010

Related U.S. Application Data

(60) Provisional application No. 61/098,521, filed on Sep. 19, 2008.

(51) Int. Cl.
*G06F 15/16* (2006.01)
*H04N 7/173* (2011.01)

(52) U.S. Cl. ............... 709/233; 709/235; 725/91
(58) Field of Classification Search .......... 709/233, 709/235; 725/95, 91
See application file for complete search history.

(56) References Cited

U.S. PATENT DOCUMENTS

| 6,256,669 | B1 | 7/2001 | Hurwitz |
| 6,292,834 | B1 | 9/2001 | Ravi et al. |
| 6,601,009 | B2 | 7/2003 | Florschuetz et al. |
| 7,409,456 | B2 * | 8/2008 | Sitaraman ............. 709/231 |
| 7,770,200 | B2 * | 8/2010 | Brooks et al. ............ 725/95 |
| 7,987,285 | B2 * | 7/2011 | Melnyk et al. ............ 709/233 |
| 2001/0044835 | A1 | 11/2001 | Schober et al. |
| 2002/0116518 | A1 | 8/2002 | Silen et al. |
| 2002/0165970 | A1 * | 11/2002 | Ludewig ............. 709/228 |
| 2003/0065803 | A1 * | 4/2003 | Heuvelman ............ 709/231 |
| 2003/0135863 | A1 * | 7/2003 | Van Der Schaar ........ 725/95 |
| 2005/0246751 | A1 * | 11/2005 | Boyce et al. ............. 725/101 |
| 2006/0026294 | A1 * | 2/2006 | Virdi et al. ............. 709/232 |
| 2006/0026296 | A1 * | 2/2006 | Nagaraj ................. 709/233 |
| 2006/0195464 | A1 | 8/2006 | Guo |
| 2007/0039028 | A1 * | 2/2007 | Bar ..................... 725/95 |
| 2007/0067424 | A1 | 3/2007 | Raciborski et al. |
| 2007/0076728 | A1 * | 4/2007 | Rieger et al. ............ 370/401 |
| 2007/0091920 | A1 * | 4/2007 | Harris et al. ............ 370/468 |
| 2008/0104268 | A1 * | 5/2008 | Farber et al. ............ 709/233 |
| 2008/0273591 | A1 * | 11/2008 | Brooks et al. ........... 375/240.01 |
| 2009/0031384 | A1 * | 1/2009 | Brooks et al. ............ 725/127 |

FOREIGN PATENT DOCUMENTS

| EP | 1024638 A1 | 8/2000 |
| EP | 1376299 A2 | 1/2004 |
| WO | WO 03/034755 A1 | 4/2003 |

* cited by examiner

*Primary Examiner* — Kevin Bates
*Assistant Examiner* — Robert B McAdams
(74) *Attorney, Agent, or Firm* — Kilpatrick Townsend & Stockton LLP

(57) ABSTRACT

A system and method for delivering content objects over the Internet to an end user system with a content delivery network (CDN) is disclosed that allows for intelligent bandwidth determination for content streams. A content object is delivered with the CDN using the Internet. When a content object is requested by an end user media player, characteristics of the access network, the content object and/or the CDN are used to choose an suitable algorithm. The algorithm then determines a bitrate for delivery of the content object to the end user media player. Ultimately, the content object is transmitted at the bitrate to the end user media player.

30 Claims, 6 Drawing Sheets

INTELLIGENT CONTENT STREAM BANDWIDTH DETERMINATION

This application claims the benefit of U.S. Provisional Application Ser. No. 61/098,521 filed on Sep. 19, 2008; which is hereby expressly incorporated by reference in its entirety for all purposes.

BACKGROUND

This disclosure relates in general to streamed content delivery and, but not by way of limitation, to choosing a bitrate for the streamed content delivery.

Streamed delivery of video is becoming more and more popular. There are many problems with streamed delivery over the Internet, for example, choosing a bitrate to supply the stream with. Any of content originator, Internet, any content delivery network (CDN), or the end user Internet service provider (ISP) may introduce a bottleneck that affects the bitrate to choose. Conventionally, a streaming device, applet or application video player will test the connection from the end user system perspective to choose from a number of possible bitrates for delivering a content object.

A particular video player has a fixed algorithm to determine the preferred bitrate. The only knowledge that is used for these algorithms is how the test works of the connection with the Internet. Any change to the connection with the Internet results in a new test of the connection and possible selection of a different bitrate. Further, some players retest the connection after fast forwarding or rewinding. With testing taking a number of seconds, the user experience is greatly affected. This is especially true for users that expect streaming media to work like cable or satellite television, which does not require testing of the connection.

SUMMARY

In one embodiment, the present disclosure provides systems and methods for aiding delivery at a number of different possible bitrates with a content delivery network (CDN) is disclosed that allows for intelligent bandwidth determination for content streams. A content object is delivered with the CDN using the Internet. When a content object is requested by an end user media player, characteristics of the access network, the content object and/or the CDN are used to choose an suitable algorithm. The algorithm then determines a bitrate for delivery of the content object to the end user media player. Ultimately, the content object is transmitted at the bitrate to the end user media player.

In another embodiment, the present disclosure provides a content delivery network (CDN) for delivering content over the Internet to an end user system where a bitrate to supply a content object to the end user system is variable. The CDN comprises a processor and a memory coupled with the processor. The processor is configured to: receiving a request to deliver the content object toward an end user system; cause retrieving information, where the information allows determining: characteristics of an access network that couples the end user system to the Internet, characteristics of the content object, and/or characteristics of the CDN; cause choosing an algorithm from a plurality of algorithms based, at least in part, on the information; cause determining the bitrate using the algorithm; and cause passing at least part of the content object to with end user system at the bitrate.

In yet another embodiment, the present disclosure provides a method for delivering content over the Internet to an end user system with a content delivery network (CDN) where a bitrate to supply a content object to the end user system is variable. At least a part of the content object is stored. The content object is delivered with the Internet from the CDN. A request to deliver the content object toward an end user system is received. Information is retrieved that allows determining: characteristics of an access network that couples the end user system to the Internet, characteristics of the content object, and/or characteristics of the CDN. An algorithm is chosen from a plurality of algorithms based, at least in part, on the information. A determination of the bitrate chosen using the algorithm is received. At least part of the content object is transmitted to the end user system at the bitrate.

In still another embodiment, the present disclosure provides a method for delivering content over the Internet to an end user system with a content provider that supports a plurality of bitrates to supply a content object to the end user system. Information is retrieved that allows determining: characteristics of an access network that couples the end user system to the Internet, characteristics of the content object, and/or characteristics of the CDN. An algorithm is chosen from a plurality of algorithms based, at least in part, on the information. The bitrate is determined using the algorithm. Passing at least part of the content object with the end user system at the bitrate, where the content object is delivered with the Internet.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the invention as set forth in the appended claims.

Figure 1:
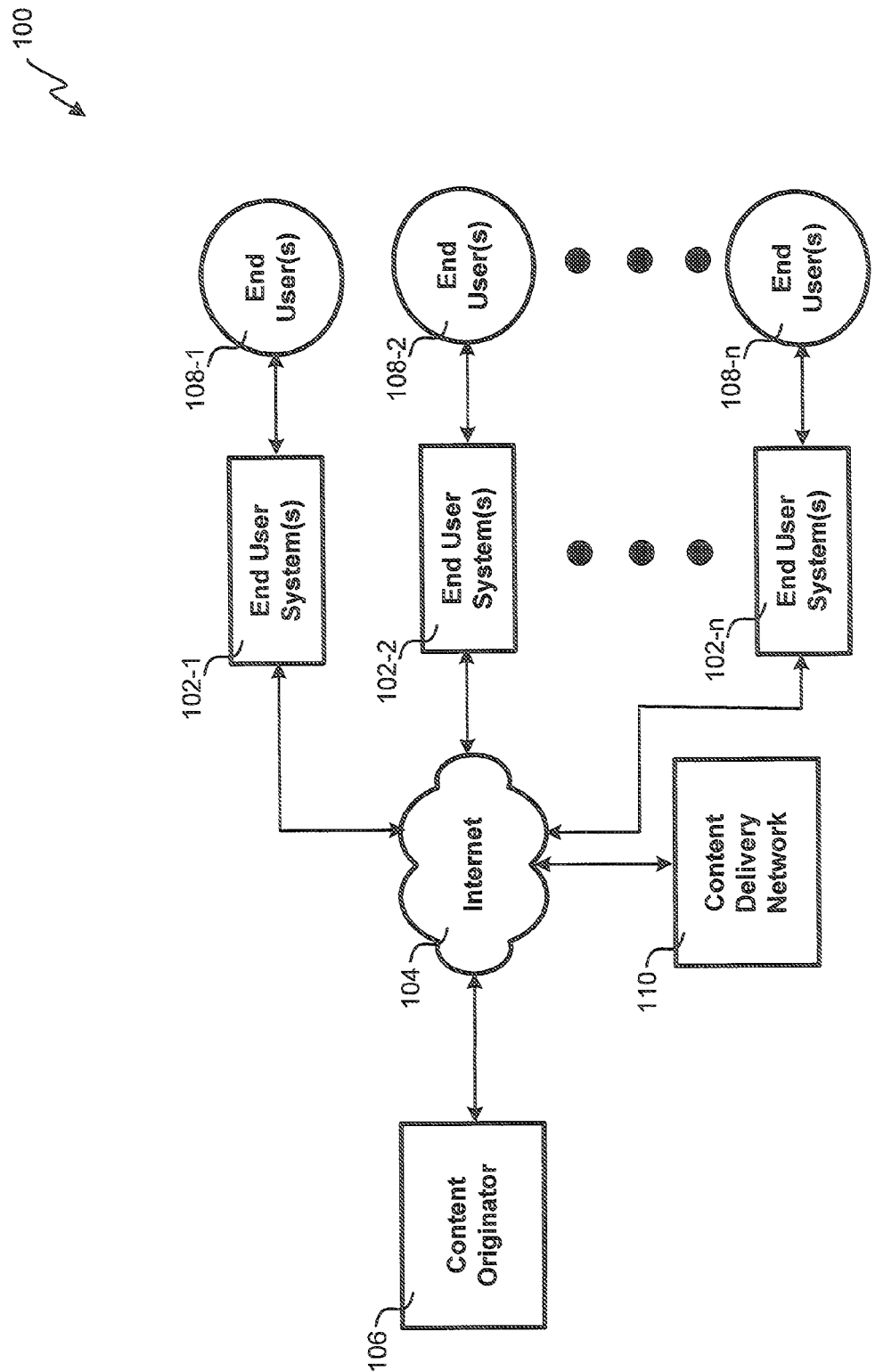
FIG. 1 depicts a block diagram of an embodiment of a content distribution system.

Referring first to FIG. 1, a block diagram of an embodiment of a content distribution system 100 is shown where content originator 106 offloads the delivery of the content objects to a content delivery network (CDN) 110. In this embodiment, the content distribution system 100 can determine a bitrate, by choosing a suitable algorithm, to supply the content objects to an end user system 102. The content originator 106 produces and/or distributes a content object. A content object is any content file or content stream and could include, for example, video, pictures, data, audio, software, and/or text. The content object could be live, delayed or stored. Throughout the specification, references may be made to a content object, content stream and/or content file, but it is to be understood that those terms could be used interchangeably wherever they may appear.

Each end user system 102 is associated with an Internet service provider (ISP), not shown in this figure, through an access network. When a content object is requested by an end user 108 through the end user system 102, characteristics of the access network, the content object and/or the CDN 110 are used to choose a suitable algorithm. The algorithm determines a bitrate to supply the requested content object to the end user system 102. Many algorithms are known to those of ordinary, skill in the art. This embodiment intelligently selects an algorithm from many different algorithms that determines the bandwidth available to the end user systems 102 for delivery of the content over the Internet 104 with adequate quality of service (QoS). Various factors may affect the bandwidth available to an end user system 102. Examples of those factors may include access networks characteristics, activity of the CDN servers, congestion between the CDN and the end user system, simultaneous requests for particular content objects, time of the day, day of the week and month of the year.

Once the bandwidth available to the end user 108 is determined, the content object is transmitted at the determined bitrate to the end user system 102. The CDN may have several versions of the content object available to send in the alternative according to the bandwidth available or could transcode the content object for each particular end user system 102. The end user system 102 receives the content object and processes it for the end user 108. The end user system 102 could be a personal computer, media player, handheld computer, Internet appliance, phone, IPTV set top box, streaming radio or any other device that can receive and play content objects. In some embodiments, a number of the end user system 102 could be networked together.

Figure 2:
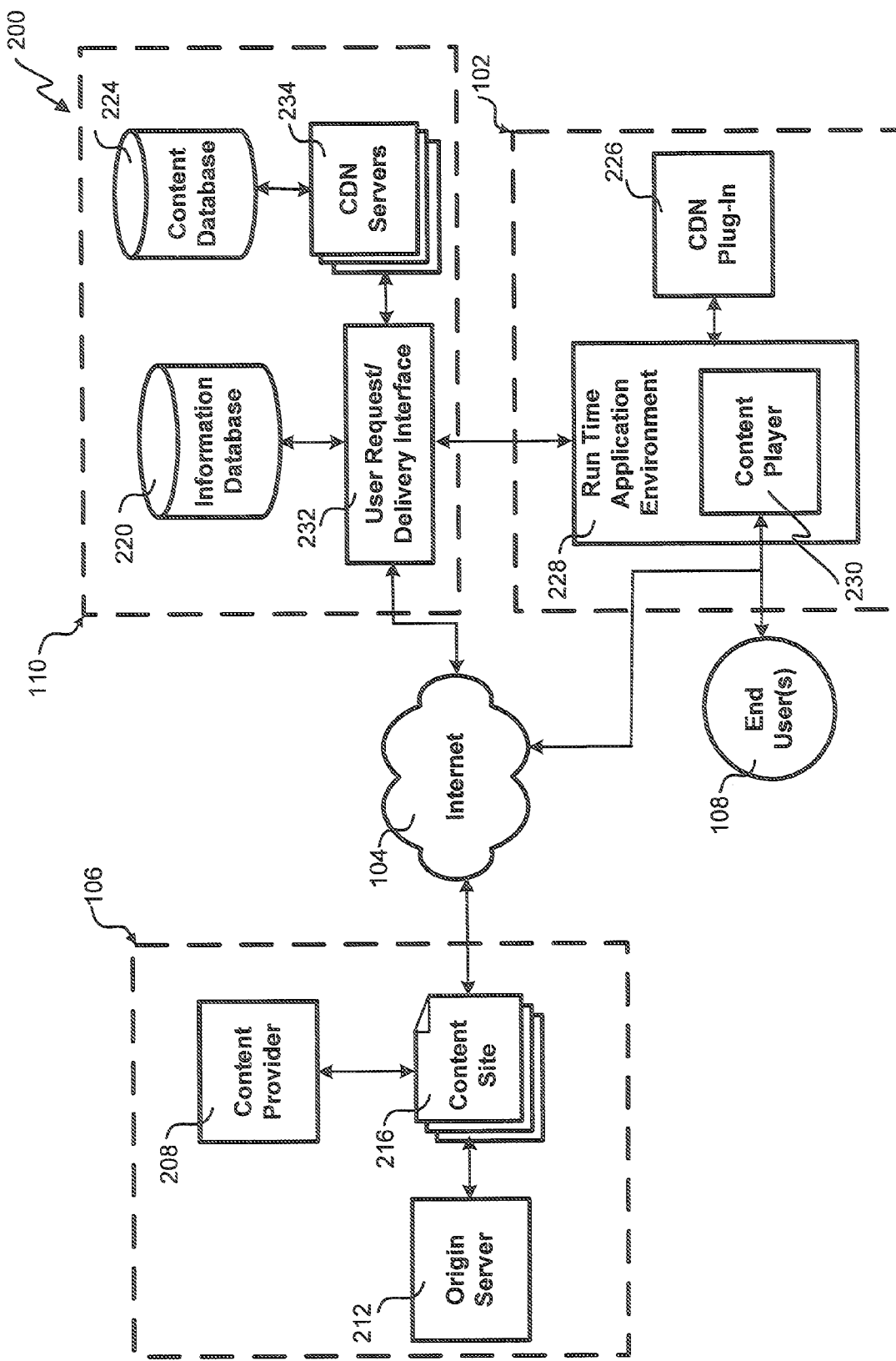
FIG. 2 depicts a block diagram of an embodiment of the content distribution system with additional detail for a content originator, a content delivery network (CDN) and a end user system.

Referring next to FIG. 2, a block diagram of an embodiment of the content distribution system 200 is shown with additional detail for the content originator 106, the CDN 110, and the end user system 102. The content originator 106 may include a content provider 208, a content site 216 and an origin server 212. The CDN 110 may include a user request/delivery interface 232, CDN servers 234, an information database 220, and a content database 224. The end user system 102 may include a run time application environment 228 with an integrated content player 230 and a CDN plug-in 226. Although this figure only shows a single content originator 106, a single end user system 102 and a single CDN 110, it is to be understood that there could be many of each in various embodiments.

Many content providers 208 use the CDN 110 to deliver the content objects over the Internet 104 to the end users 108. When a content object is requested by an end user 108, the CDN 110 may retrieve the content object from the content provider 208 should it not be readily available within the CDN 110 already. Alternatively, the content provider 208 may directly provide the content object to the CDN 110, i.e., in advance of the first request. In this embodiment, the content objects are provided to the CDN 110 and stored in one or more CDN servers 234 such that requests may be served from the CDN 110. The origin server 212 holds a copy of each content object for the content originator 106. Periodically, the contents of the origin server 212 may be reconciled with the CDNs 110 through a cache and/or pre-population algorithm. A content database 224 stores information to indicate the content objects available within the CDN 110. Embodiments could have many content databases 224 for each server, cluster of servers, POP, or region.

When an end user 108 requests a content object through an end user system 102, the content player 230 and/or the CDN plug-in 226 passes the request either directly or indirectly via the Internet 104 to the content originator 106. The content originator 106 is the source or re-distributor of content objects. The content site 216 is an Internet site accessible by the end user system 102. In one embodiment, the content site 216 could be a web site where the content is viewable with a web browser. In other embodiments, the content site 216 could be accessible with application software other than a web browser. The content provider 208 can redirect content requests to any CDN 110 after they are made or can formulate the delivery path when the web page is formulated. In any event, the request for content is handed over to the CDN 110 in this embodiment.

An information database 220 stores information that is relevant to the characteristics of the access network, the content objects, and/or the CDN 110. When a request for content is received, the access network information from the information database 220, is used to choose from several algorithms that determine the bandwidth available to the end user system 102. Choosing of the algorithm can be performed in the CDN 110, the end user system 102, the content provider 208 or elsewhere on the Internet in various embodiments. The CDN plug-in 226 gathers the IP address or other characteristics of the end user system 102 via the run time application environment 228. When this information is not available, the CDN-plug-in 226 may use other information, for example, the content object characteristics and/or the CDN characteristics in the information database 120.

To determine the bandwidth available to the requested end user system 102, the CDN plug-in 226 first chooses an algorithm based on information retrieved from the information database 220. Once the algorithm is chosen, the runtime application environment 228 performs the chosen algorithm to simulate or test a content download according to the algorithm. This allows determining an adequate bitrate at which the content object may be served under current conditions. By selection of the algorithm that best suits current conditions to begin with, an adequate bit rate can be found quickly in one embodiment. As will be described further below in various embodiments, the bitrate determination may be performed by various algorithms. The CDN 110 then transmits the requested content at the bitrate to the end user system 102. The information data base 220 is periodically updated by the runtime application environment 228 and historical trends can be stored and used for future determinations.

Each end user system 102 is associated with an Internet service provider (ISP), which is not shown in this embodiment. Each ISP provides Internet connectivity to one or more end users 108 at different speed level depending on each end user's subscription level. In addition to the end user subscription level, the bandwidth available to an end user system 102 may vary depending on other factors such as activity of the origin and/or CDN servers, network traffic congestion anywhere along the delivery chain, IP address space, requested content objects, time of the day, day of the week and month of the year, correlation to special events. Table I shows an example of access network bandwidth offered by various ISPs at different subscription levels. Table I also shows how the access network bandwidth may vary on average according to the time factor. The granularity of this information could be much greater in some embodiments. For example, typical results for a particular IP address could be tracked over time to provide much more accurate estimations of the bandwidth likely available.

TABLE I

Example of Access Network Bandwidth offered by various ISPs

| Internet Service Providers (ISPs) | Access Network Bandwidth | Access Network Bandwidth as a function of Time | |
|---|---|---|---|
| | | Business Hours | After Business Hours |
| ACME ISP | 768 Kb/s | 500 < BW < 768 | 650 < BW < 768 |
| | 1.5 Mb/s | 0.8 < BW < 1.5 | 1 < BW < 1.5 |
| | 3 Mb/s | 1.5 < BW < 3 | 2 < BW < 3 |
| | 6 Mb/s | 3 < BW < 6 | 4.5 < BW < 6 |
| Atlas ISP | 768 Kb/s | 500 < BW < 768 | 650 < BW < 768 |
| | 3 Mb/s | 1.5 < BW < 3 | 2 < BW < 3 |
| | 6 Mb/s | 3 < BW < 6 | 4.5 < BW < 6 |
| | 9 Mb/s | 6 < BW < 9 | 7.5 < BW < 9 |
| Speeedy ISP | 1.5 Mb/s | 0.8 < BW < 1.5 | 1 < BW < 1.5 |
| | 6 Mb/s | 3 < BW < 6 | 4.5 < BW < 6 |
| | 12 Mb/s | 6 < BW < 12 | 9 < BW < 12 |
| | 20 Mb/s | 12 < BW < 20 | 15 < BW < 20 |

Figure 3:
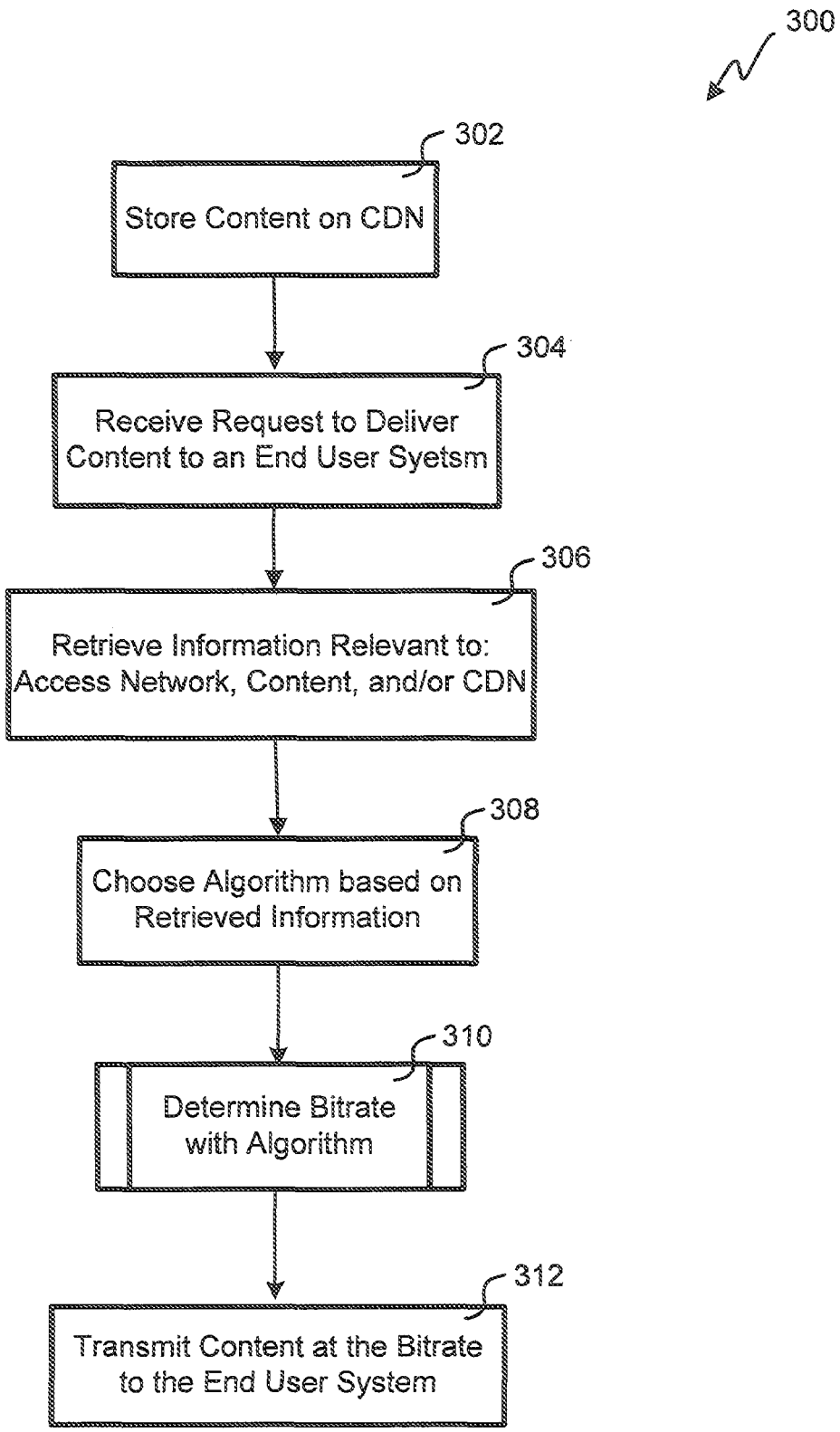
FIG. 3 illustrates a flowchart of an embodiment of a process for delivering content over the Internet to the end user system with the CDN.

Referring next to FIG. 3, an embodiment of a process 300 for delivering content over the Internet 104 to an end user system with a CDN 110 is shown. The depicted portion of the process begins in block 302 where the CDN 110 stores content on the CDN servers 234 and updates the content database 224. After receiving a user request to deliver content to an end user system 102 at block 304, processing continues to block 306 where the CDN plug-in 226 retrieves information relevant to the access network, the requested content object, and/or the CDN from the information database 220.

The CDN plug-in 226 then chooses an algorithm in block 308 based, at least in part, on the retrieved information at block 306. Some embodiments may have the CDN choose the algorithm and relay that selection to the content player 230. Several different algorithms may be chosen from in this embodiment. The algorithm quickly determines an adequate bitrate at which the content may be delivered to an end user system 102 with little or no loss. In one embodiment, the chosen algorithm may start downloading the content at a low bitrate and gradually increase the bitrate. In an alternative embodiment, the chosen algorithm may start downloading the content at a high bitrate and gradually decrease the bitrate. Other embodiments may use a mid-level bitrate as their starting point and download the content at the mid-level bitrate or move up or down from that point. The content player 230 increases or decreases the bandwidth through communication with the run time application environment 228 to implement the various algorithms.

The run time application environment 228, the content player 230 and the CDN plug-in 226 are used at block 310 to determine a bitrate for delivering the content. In this embodiment, the bitrate is determined by performing the chosen algorithm to simulate a content download. Once the bitrate is determined, processing continues to block 312 where the CDN 110 transmits the requested content to the end user system 102.

Although not shown in the figure, conditions of the network may change. A new bitrate determination can be made at any time as those conditions change. For example, where a bitrate is causing packet loss or other errors, the process of finding a new bitrate can begin again in the manner described herein.

Figure 4:
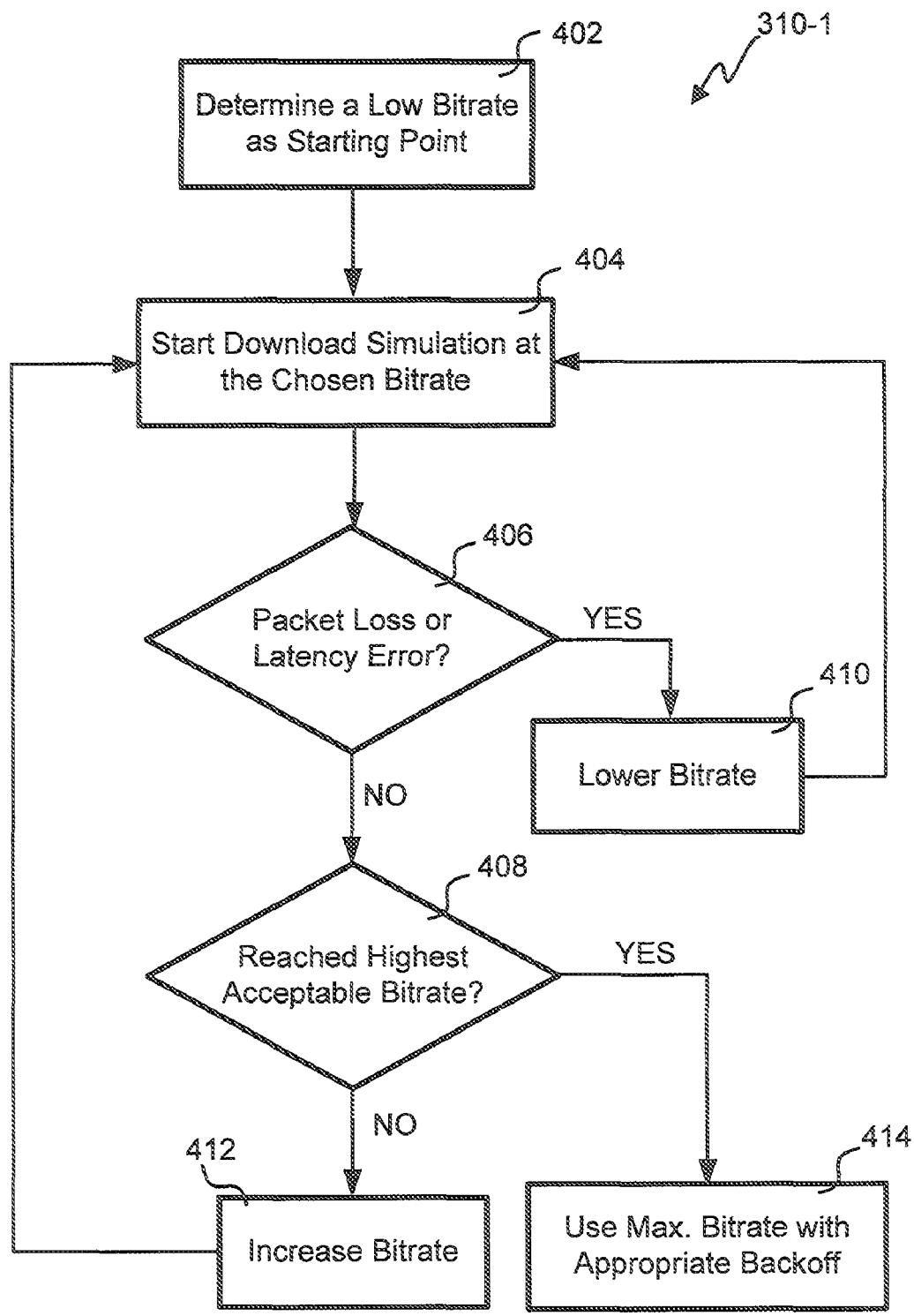
FIGS. 4, 5 and 6 illustrate flowcharts of embodiments of a process for determining a bitrate for downloading a content object.

With reference to FIG. 4, a flow diagram of an embodiment of process 310-1 for determining a bitrate for downloading a content object is shown. Content objects are typically precoded at a number of different bitrates or can be transcoded in real time according to any number of different fixed and variable bitrates. The depicted portion of the process begins in block 402 where the algorithm determines a low bitrate as a starting point. Once the starting point is determined, processing continues to block 404 where the content download simulation starts at the chosen bitrate.

A determination is made, at block 406 as to whether a packet loss or latency error has been detected. If a packet loss or latency error is detected, processing flows from block 406 to block 410 where the bitrate is lowered to avoid the error. The processing then goes back to block 404 for performing the simulation at the new bitrate. If there is no packet loss or other error, processing goes from block 406 to block 408 where another determination is made as to whether the processing reached its maximum bitrate.

If the maximum bitrate is reached, processing flows from block 408 to block 414 where the runtime application environment 228 uses the maximum bitrate to perform the content download with an appropriate backoff. If the maximum bitrate is not reached in block 408, processing goes to block 412 where the runtime application environment 228 increases the bitrate. The processing then goes back to block 404 for performing the content download simulation at the new bitrate.

Figure 5:
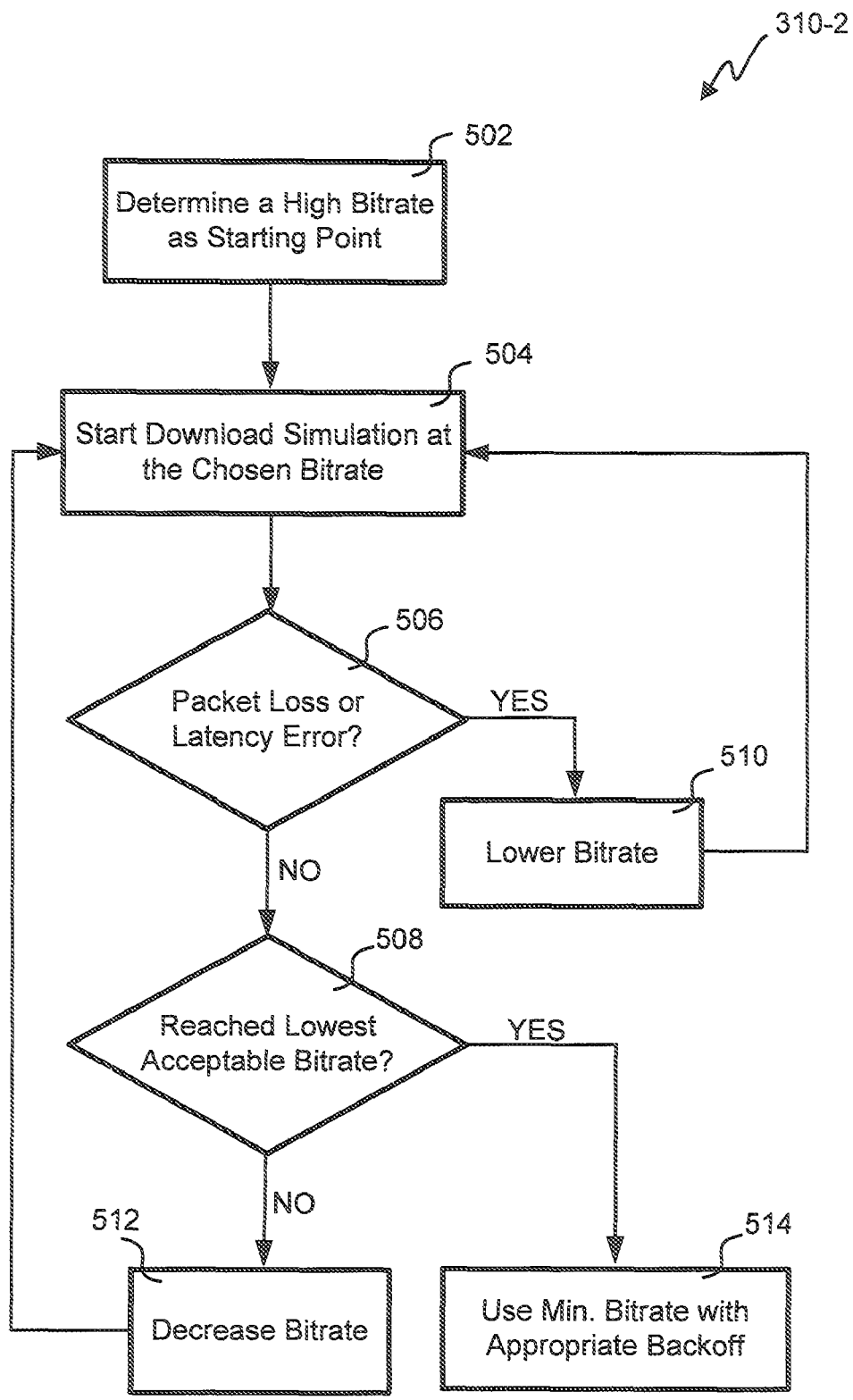

Referring next to FIG. 5, a flow diagram of another embodiment of a process 310-2 for determining a bitrate is shown. This embodiment differs from that of FIG. 4 in that at block 502 the algorithm starts at a high bitrate initially. In addition, at block 508, a determination is made as to whether the processing reached its minimum bitrate. If the minimum bitrate is reached, the processing flows from block 508 to block 514 where the runtime application environment 228 uses the minimum bitrate to simulate the content download with an appropriate backoff. If the minimum bitrate is not reached, processing goes from block 508 to block 512 where the runtime application environment 228 decreases the bitrate. The processing then goes back to block 504 for performing the download simulation at the new bitrate.

Figure 6:
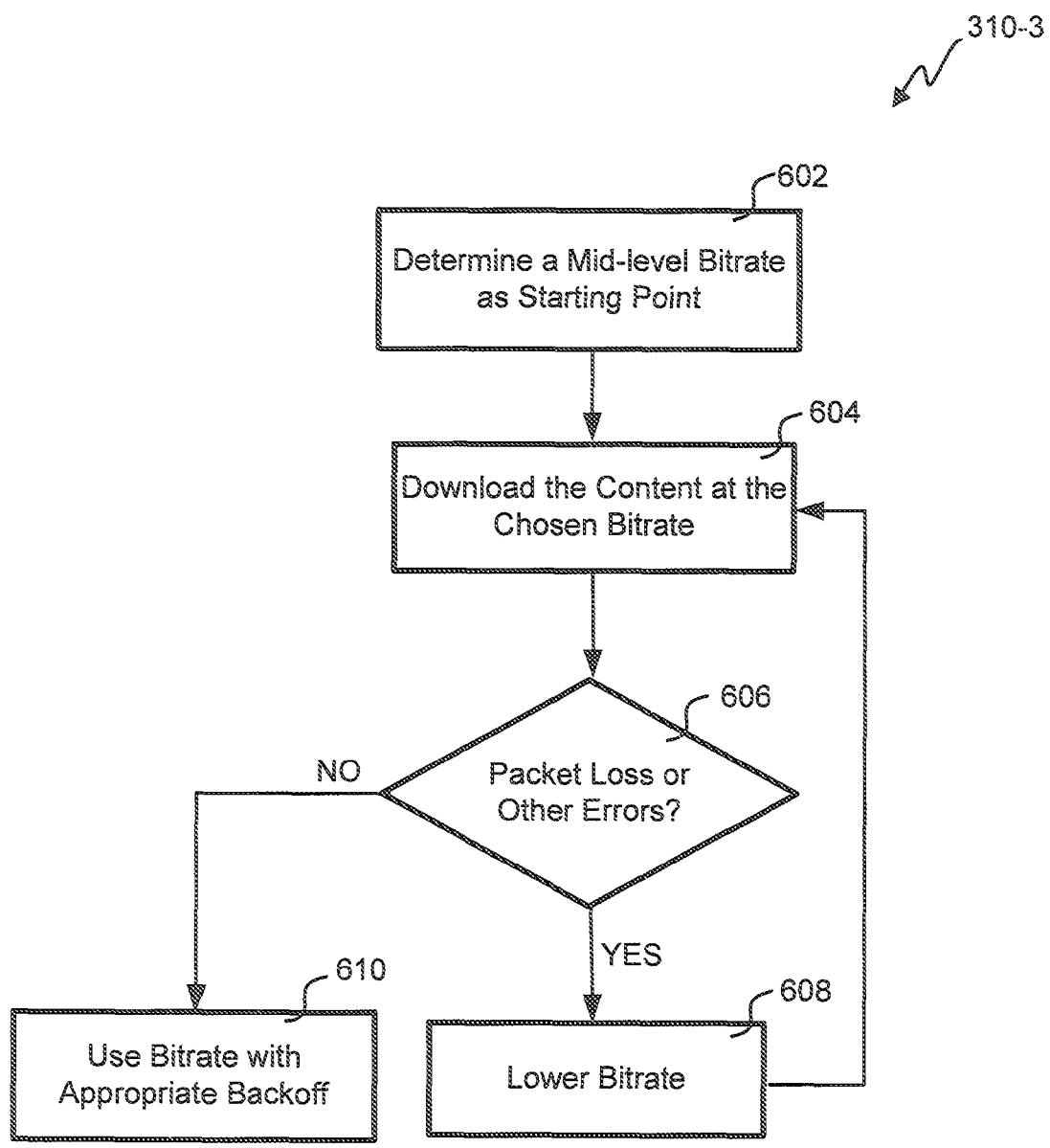

With reference to FIG. 6, a flow diagram of yet another embodiment of a process 310-3 for determining a bitrate is shown. The depicted portion of the process begins in step 602 where the algorithm determines a mid-level bitrate as its starting point. Analysis of the information database allows a better estimation of a mid-level starting point. In this embodiment, the download simulation is performed at a fixed bitrate in block 604. A determination is made, at block 606 as to whether a packet loss or latency error has been detected. If no packet loss or other errors are detected, processing goes from block 606 to block 610 for using the current bitrate. If a packet loss or latency error is detected, processing flows from block 606 to block 608 where the bitrate is lowered to avoid error. The processing then goes back to block 604 for starting the content download simulation at the new bitrate. This process continues until an acceptable bitrate is chosen.

Various embodiments are discussed above giving examples of the invention. Other alternatives are possible, for example, there need not be a run time environment. Set top boxes and media players can implement this functionality in compiled applications or state machines. The various algorithms can be chosen from and the bandwidth determined in the same way using compiled applications on the end user system.

While the principles of the disclosure have been described above in connection with specific apparatuses and methods, it is to be clearly understood that this description is made only by way of example and not as limitation on the scope of the invention.

What is claimed is:

1. A content delivery network (CDN) for delivering content over the Internet to an end user system where a bitrate to supply a content object to the end user system is variable, the CDN comprising:
a processor configured to:
pass a request to deliver the content object toward an end user system;
cause retrieving information, wherein the information allows determining:
characteristics of an access network that couples the end user system to the Internet,
characteristics of the content object, and/or
characteristics of the CDN;
cause choosing an algorithm from a plurality of algorithms based, at least in part, on the information, wherein each of the algorithms includes a different systematic variation across a plurality of bitrates;
cause downloading of one or more test content objects at a first bitrate and increasing or decreasing the bitrate from the first bitrate to a second bitrate according to an algorithm;
determine that a performance of the download at the second bitrate exceeded a performance of the download at the first bitrate; and
cause passing at least part of the content object with the end user system at the second bitrate; and
a memory coupled with the processor.

2. The CDN for delivering content over the Internet to the end user system where the bitrate to supply the content object to the end user system is variable as recited in claim 1, wherein the CDN is private only carrying content from a single content originator.

3. The CDN for delivering content over the Internet to the end user system where the bitrate to supply the content object to the end user system is variable as recited in claim 1, wherein the choosing an algorithm is performed by one of the CDN or the end user system.

4. The CDN for delivering content over the Internet to the end user system where the bitrate to supply the content object to the end user system is variable as recited in claim 1, wherein the processor is distributed through a plurality of servers across the CDN.

5. A method for delivering content over the Internet to an end user system with a content delivery network (CDN) where a bitrate to supply a content object to the end user system is variable, the method comprising:
storing at least part of the content object, wherein the content object is delivered with the Internet and the CDN;
passing a request to deliver the content object toward an end user system;
retrieving information, wherein the information allows determining:
characteristics of an access network that couples the end user system to the Internet,
characteristics of the content object, and/or
characteristics of the CDN;
choosing an algorithm from a plurality of algorithms based, at least in part, on the information, wherein each of the algorithms includes a different systematic variation across a plurality of bitrates;
downloading one or more test content objects at a first bitrate and increasing or decreasing the bitrate from the first bitrate to a second bitrate according the algorithm;
determine that a performance of the download at the second bitrate exceeded a performance of the download at the first bitrate;
passing a determination that the second bitrate is to be used; and
passing at least part of the content object with the end user system at the second bitrate.

6. The method for delivering content over the Internet to the end user system with the CDN where the bitrate to supply the content object to the end user system as recited in claim 5, wherein the determining characteristics is performed within the CDN.

7. The method for delivering content over the Internet to the end user system with the CDN where the bitrate to supply the content object to the end user system as recited in claim 5, wherein the retrieving information passes the information from the CDN to the end user system such that the determining characteristics is performed by the end user system.

8. The method for delivering content over the Internet to the end user system with the CDN where the bitrate to supply the content object to the end user system as recited in claim 5, wherein the choosing the algorithm is performed in one of the CDN or end user system.

9. The method for delivering content over the Internet to the end user system with the CDN where the bitrate to supply the content object to the end user system as recited in claim 5, wherein the algorithm comprises increasing a bitrate from the first bitrate while downloading the one or more test content objects.

10. The method for delivering content over the Internet to the end user system with the CDN where the bitrate to supply the content object to the end user system as recited in claim 5, wherein the algorithm comprises decreasing a bitrate from the first bitrate while downloading the one or more test content objects.

11. The method for delivering content over the Internet to the end user system with the CDN where the bitrate to supply the content object to the end user system as recited in claim 5, wherein the first bitrate is neither the highest nor the lowest available bitrate.

12. The method for delivering content over the Internet to the end user system with the CDN where the bitrate to supply the content object to the end user system as recited in claim 5, wherein:
    the content object is available encoded in a plurality of different bitrates, and
    the transmitting at least part of the content object is performed at one of the plurality of bitrates.

13. The method for delivering content over the Internet to the end user system with the CDN where the bitrate to supply the content object to the end user system as recited in claim 5, wherein the content object comprises a video file or stream.

14. The method for delivering content over the Internet to the end user system with the CDN where the bitrate to supply the content object to the end user system as recited in claim 5, wherein the end user system is a set top box.

15. A method for delivering content over the Internet to an end user system with a content provider that supports a plurality of bitrates to supply a content object to the end user system, the method comprising:
    retrieving information, wherein the information allows determining:
        characteristics of an access network that couples the end user system to the Internet,
        characteristics of the content object, and/or
        characteristics of the CDN;
    choosing an algorithm from a plurality of algorithms based, at least in part, on the information, wherein each of the algorithms includes a different systematic variation across a plurality of bitrates;
    downloading one or more test content objects at a first bitrate and increasing or decreasing the bitrate from the first bitrate to a second bitrate according to the algorithm;
    determining that a performance of the download at the second bitrate exceeded a performance of the download at the first bitrate; and
    passing at least part of the content object with the end user system at the second bitrate, wherein the content object is delivered with the Internet.

16. The method for delivering content over the Internet to the end user system with the content provider that supports the plurality of bitrates to supply the content object to the end user system as recited in claim 15, wherein the determining characteristics is performed within the CDN.

17. The method for delivering content over the Internet to the end user system with the content provider that supports the plurality of bitrates to supply the content object to the end user system as recited in claim 15, further comprising requesting at least part of the content object.

18. The method for delivering content over the Internet to the end user system with the content provider that supports the plurality of bitrates to supply the content object to the end user system as recited in claim 15, wherein after retrieving the information, the information is sent from the content provider to the end user system.

19. The method for delivering content over the Internet to the end user system with the content provider that supports the plurality of bitrates to supply the content object to the end user system as recited in claim 15, wherein the choosing algorithm is performed in one of the content provider or end user system.

20. The method for delivering content over the Internet to the end user system with the content provider that supports the plurality of bitrates to supply the content object to the end user system as recited in claim 15, wherein the content provider is one of a CDN server or an origin server.

21. The method for delivering content over the Internet to the end user system with the content provider that supports the plurality of bitrates to supply the content object to the end user system as recited in claim 15, wherein:
    the content object is available encoded in a plurality of different bitrates, and
    the sending at least part of the content object is done with one of the plurality of bitrates.

22. The CDN for delivering content over the Internet to the end user system where the bitrate to supply the content object to the end user system is variable as recited in claim 1, wherein the processor is further configured to cause downloading a test content object at a plurality of bitrates.

23. The method for delivering content over the Internet to the end user system with the CDN where the bitrate to supply the content object to the end user system as recited in claim 5, further comprising downloading of a test content object at a plurality of bitrates.

24. The method for delivering content over the Internet to the end user system with the content provider that supports the plurality of bitrates to supply the content object to the end user system as recited in claim 15, further comprising downloading of a test content object at a plurality of bitrates.

25. The CDN for delivering content over the Internet to the end user system where the bitrate to supply the content object to the end user system is variable as recited in claim 1, wherein a first and a second of the plurality of algorithms each comprise systematic variation of a bitrate of a download of a test content object, the systematic variation differs between the first and second algorithms.

26. The CDN for delivering content over the Internet to the end user system where the bitrate to supply the content object to the end user system is variable as recited in claim 1, wherein a first of the plurality of algorithms comprises systematically increasing a bitrate of a download of the one or more test content objects, and
    wherein a second of the plurality of algorithms comprises systematically decreasing a bitrate of a download of the one or more test content objects.

27. The method for delivering content over the Internet to the end user system with the CDN where the bitrate to supply the content object to the end user system as recited in claim 5, wherein a first and a second of the plurality of algorithms each comprise systematic variation of a bitrate of a download of the one or more test content objects, the systematic variation differs between the first and second algorithms.

28. The method for delivering content over the Internet to the end user system with the CDN where the bitrate to supply the content object to the end user system as recited in claim 5, wherein a first of the plurality of algorithms comprises systematically increasing a bitrate of a download of the one or more test content objects, and
    wherein a second of the plurality of algorithms comprises systematically decreasing a bitrate of a download of the one or more test content objects.

29. The method for delivering content over the Internet to the end user system with the content provider that supports the plurality of bitrates to supply the content object to the end user system as recited in claim 15, wherein a first and a second of the plurality of algorithms each comprise systematic variation of a bitrate of a download of the one or more test content objects, the systematic variation differs between the first and second algorithms.

30. The method for delivering content over the Internet to the end user system with the content provider that supports the plurality of bitrates to supply the content object to the end user system as recited in claim 15, wherein a first of the plurality of algorithms comprises systematically increasing a bitrate of a download of the one or more test content objects, and wherein a second of the plurality of algorithms comprises systematically decreasing a bitrate of a download of the one or more test content objects.

* * * * *